(12) United States Patent
McElroy et al.

(10) Patent No.: US 8,986,905 B2
(45) Date of Patent: Mar. 24, 2015

(54) FUEL CELL INTERCONNECT

(75) Inventors: James F. McElroy, Suffield, CT (US); Matthias Gottmann, Sunnyvale, CA (US); Stephen Couse, Sunnyvale, CA (US)

(73) Assignee: Bloom Energy Corporation, Sunnyvale, CA (US)

(*) Notice: Subject to any disclaimer, the term of this patent is extended or adjusted under 35 U.S.C. 154(b) by 1052 days.

(21) Appl. No.: 12/268,585

(22) Filed: Nov. 11, 2008

(65) Prior Publication Data

US 2010/0119909 A1    May 13, 2010

(51) Int. Cl.
*H01M 8/02*    (2006.01)
*H01M 8/24*    (2006.01)
*H01M 8/12*    (2006.01)

(52) U.S. Cl.
CPC .......... *H01M 8/2465* (2013.01); *H01M 8/0258* (2013.01); *H01M 8/0263* (2013.01); *H01M 8/2425* (2013.01); *H01M 2008/1293* (2013.01); *Y02E 60/50* (2013.01); *Y02E 60/525* (2013.01)
USPC ........... 429/514; 429/452; 429/454; 429/455; 429/456; 429/457; 429/513

(58) Field of Classification Search
CPC ........................ H01M 8/0263; H01M 8/0258
USPC .................... 429/512–514, 518, 454–457
See application file for complete search history.

(56) References Cited

U.S. PATENT DOCUMENTS

| | | | |
|---|---|---|---|
| 4,292,379 A | 9/1981 | Kothmann | |
| 5,273,837 A | 12/1993 | Aitken et al. | |
| 5,460,897 A | 10/1995 | Gibson et al. | |
| 5,501,914 A | 3/1996 | Satake et al. | |
| 5,518,829 A | 5/1996 | Satake et al. | |
| 5,554,454 A | 9/1996 | Gardner et al. | |
| 5,686,199 A * | 11/1997 | Cavalca et al. | 429/514 |
| 5,942,349 A | 8/1999 | Badwal et al. | |
| 5,964,991 A | 10/1999 | Kawasaki et al. | |
| 5,981,098 A | 11/1999 | Vitale | |
| 6,183,897 B1 | 2/2001 | Hartvigsen et al. | |
| 6,251,534 B1 | 6/2001 | McElroy | |
| 6,280,868 B1 | 8/2001 | Badwal et al. | |
| 6,348,280 B1 | 2/2002 | Maeda et al. | |
| 6,406,809 B1 | 6/2002 | Fujii et al. | |
| 6,444,340 B1 | 9/2002 | Jaffrey | |

(Continued)

FOREIGN PATENT DOCUMENTS

| | | |
|---|---|---|
| JP | 61148766 | 7/1986 |
| JP | 6215778 | 8/1994 |

(Continued)

OTHER PUBLICATIONS

Office Action received in U.S. Appl. No. 12/010,884 (20 pgs), Sep. 30, 2009.

*Primary Examiner* — Ula C. Ruddock
*Assistant Examiner* — Scott J Chmielecki
(74) *Attorney, Agent, or Firm* — The Marbur Law Group PLLC

(57) ABSTRACT

A fuel cell interconnect includes a first side containing a first plurality of channels and a second side containing a second plurality of channels. The first and second sides are disposed on opposite sides of the interconnect. The first plurality of channels are configured to provide a serpentine fuel flow field while the second plurality of channels are configured to provide an approximately straight air flow field.

14 Claims, 8 Drawing Sheets

(56) References Cited

U.S. PATENT DOCUMENTS

| | | |
|---|---|---|
| 6,492,053 B1 | 12/2002 | Donelson et al. |
| 6,492,055 B1 | 12/2002 | Shimotori et al. |
| 6,503,653 B2 | 1/2003 | Rock |
| 6,635,378 B1 | 10/2003 | Yang et al. |
| 6,777,126 B1 | 8/2004 | Allen |
| 6,803,136 B2 | 10/2004 | Ong et al. |
| 6,835,488 B2 | 12/2004 | Sasahara et al. |
| 6,890,677 B2 | 5/2005 | Klitsner et al. |
| 6,945,266 B2 | 9/2005 | De Tezanos Pinto |
| 7,150,934 B2 | 12/2006 | Yoshida et al. |
| 2002/0081478 A1 | 6/2002 | Busenbender |
| 2002/0132156 A1 | 9/2002 | Ruhl et al. |
| 2003/0022053 A1 | 1/2003 | Anderson |
| 2003/0082434 A1 | 5/2003 | Wand et al. |
| 2003/0157387 A1 | 8/2003 | Hase et al. |
| 2003/0165730 A1* | 9/2003 | Dohle et al. ............. 429/38 |
| 2003/0180602 A1 | 9/2003 | Finn et al. |
| 2004/0115509 A1* | 6/2004 | Yoshida et al. ........... 429/35 |
| 2004/0151975 A1* | 8/2004 | Allen ....................... 429/38 |
| 2004/0265675 A1 | 12/2004 | Woodcock et al. |
| 2005/0008921 A1 | 1/2005 | Johnson |
| 2005/0019646 A1 | 1/2005 | Joos |
| 2005/0048351 A1* | 3/2005 | Hood et al. ............... 429/38 |
| 2005/0115825 A1* | 6/2005 | Frank et al. .............. 204/253 |
| 2005/0227134 A1 | 10/2005 | Nguyen |
| 2005/0255364 A1 | 11/2005 | Cho et al. |
| 2006/0105223 A1* | 5/2006 | Choi et al. ............... 429/38 |
| 2006/0154125 A1* | 7/2006 | Na et al. .................. 429/26 |
| 2006/0204826 A1 | 9/2006 | Borchers |
| 2006/0204827 A1 | 9/2006 | Hickey et al. |
| 2006/0240309 A1* | 10/2006 | Dehne ..................... 429/38 |
| 2007/0042257 A1 | 2/2007 | Chyou et al. |
| 2007/0196704 A1 | 8/2007 | Valensa et al. |
| 2008/0193825 A1 | 8/2008 | Nguyen et al. |
| 2008/0199738 A1 | 8/2008 | Perry et al. |
| 2008/0226963 A1* | 9/2008 | Wang et al. .............. 429/34 |
| 2008/0286617 A1* | 11/2008 | Ueda et al. .............. 429/13 |
| 2009/0068535 A1* | 3/2009 | Owejan et al. .......... 429/34 |
| 2010/0227257 A1* | 9/2010 | Takeguchi et al. ....... 429/514 |

FOREIGN PATENT DOCUMENTS

| | | |
|---|---|---|
| KR | 10-2006-0019998 A | 3/2006 |
| WO | WO03/007413 | 1/2003 |
| WO | WO 03007413 A1 * | 1/2003 |
| WO | WO03/071618 | 8/2003 |
| WO | WO 2004/102706 A2 | 11/2004 |

* cited by examiner

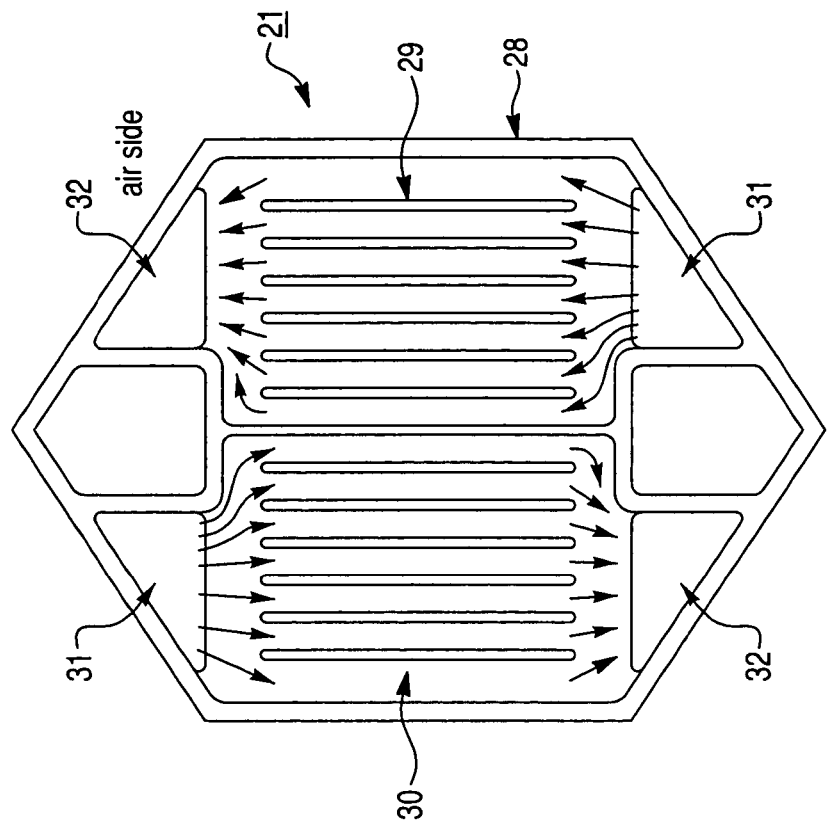
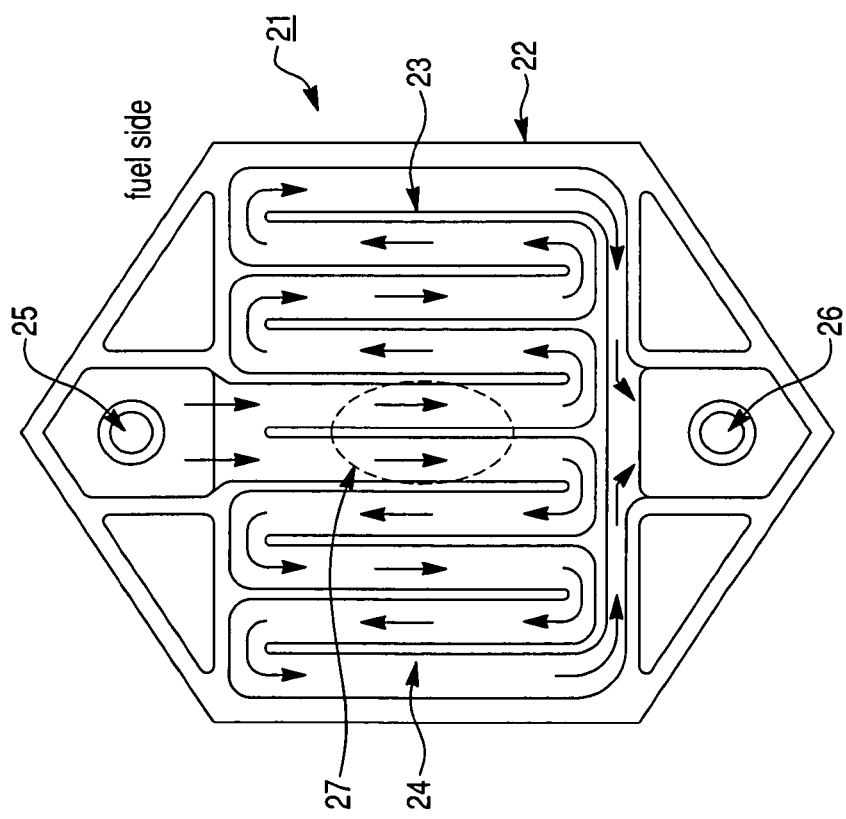

FUEL CELL INTERCONNECT

BACKGROUND OF THE INVENTION

The present invention is generally directed to fuel cell components and more specifically to fuel cell stack interconnects.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels.

Classes of fuel cells include solid oxide fuel cells and solid oxide reversible fuel cells. Solid oxide reversible fuel cells allow reversed operation, such that water or other oxidized fuel can be reduced to unoxidized fuel using electrical energy as an input.

A solid oxide fuel cell (SOFC) system is a high temperature fuel cell system where an oxidizing flow is passed through the cathode side of the fuel cell while a fuel flow is passed through the anode side of the fuel cell. The fuel cell typically operates at a temperature between 750° C. and 950° C. and enables the transport of negatively charged oxygen ions from the cathode flow stream to the anode flow stream. The oxygen ions combine with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In an internally manifolded stack, the fuel and air is distributed to each cell using risers contained within the stack. Gas flows through openings or holes in the supporting layer of each fuel cell, such as the electrolyte layer, and gas separator of each cell. In an externally manifolded stack, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Both fuel and air have to be provided to the electrochemically active surface, which can be a large surface. A fuel cell stack contains a gas flow separator plate that separates the individual cells in the stack. The gas flow separator plate separates fuel, such as hydrogen or a hydrocarbon fuel, flowing to the anode of one cell in the stack, from oxidant, such as air, flowing to the cathode of an adjacent cell in the stack. Frequently, the gas flow separator plate is also used as an interconnect made of or containing an electrically conductive material which electrically connects the fuel electrode of one cell to the air electrode of the adjacent cell.

It is difficult to achieve a reliable high fuel utilization in tall fuel cell stacks. Achieving high cell performance and maintaining that performance level for multiple years is desired for reaching economic viability in a commercial base load application.

SUMMARY OF THE INVENTION

One aspect of the present invention provides a fuel cell interconnect which includes a first side comprising a first plurality of ribs and a first plurality of channels, a second side comprising a second plurality ribs and a second plurality of channels, a fuel inlet opening, and a fuel outlet opening. The first and second sides are disposed on opposite sides of the interconnect. The first plurality of channels are configured to provide a serpentine fuel flow field, and the second plurality of channels are configured to provide an approximately straight air flow field.

In one embodiment, the first plurality of ribs is offset from the second plurality of ribs. In another embodiment, the first plurality of channels are configured to provide a parallel-serpentine fuel flow field to a right half of the first side and a left half of the first side.

Another aspect of the present invention provides a fuel cell interconnect which includes a first side comprising a first plurality of ribs and a first plurality of channels, a second side comprising a second plurality ribs and a second plurality of channels, a fuel inlet opening, and a fuel outlet opening. The first plurality of channels are configured to provide a fuel flow field comprising multiple passages. The fuel flow field comprises a fuel flow path approximately directly from the fuel inlet opening to the middle portion of the first side, and continues from the middle portion to the periphery of the first side. The first side may be coated with a fuel reformation catalyst.

In one embodiment, the second plurality of channels are configured to provide an approximately straight air flow field. In another embodiment, the first plurality of channels are configured to provide a serpentine fuel flow field comprising multiple serpentine passages. The multiple serpentine passages may be essentially continuous and uninterrupted from the fuel inlet opening to the fuel outlet opening. The fuel flow path may first extend at least 50% of the width of the first side from the fuel inlet opening and across the middle portion of the first side, then to the periphery of the first side and then to the fuel outlet opening. Preferably, the fuel flow path does not extend from the fuel inlet opening to the periphery of the first side.

Another aspect of the present invention provides a fuel cell interconnect which includes a first side comprising a first plurality of ribs and a first plurality of channels, a fuel inlet opening, a fuel outlet opening, and a second side comprising a second plurality ribs and a second plurality of channels. The first plurality of channels are configured to provide a fuel flow field comprising multiple passages, wherein the fuel flow field comprises a fuel flow path approximately directly from the fuel inlet opening to the periphery of the first side without passing to the middle portion of the first side. The fuel cell interconnect may or may not comprise a reformation catalyst.

In one embodiment, the second plurality of channels are configured to provide an approximately straight air flow field. In another embodiment, the first plurality of channels are configured to provide a serpentine fuel flow field comprising multiple serpentine passages. The multiple serpentine passages may be essentially continuous and uninterrupted from the fuel inlet opening to the fuel outlet opening.

In another embodiment, the fuel flow path continues to the middle portion of the first side from the peripheral portions of the first side and then to the fuel outlet opening.

In another embodiment, the periphery of the first side are subjected to an approximately highest current during operation of a fuel cell stack. The periphery of the first side may also be subjected to an approximately highest heat generation during operation of a fuel cell stack.

BRIEF DESCRIPTION OF THE DRAWINGS

FIG. 2A is a top view of a first side of a fuel cell interconnect according to a second embodiment of the present invention.

FIG. 2B is a top view of a second side of the fuel cell interconnect of FIG. 2A according to the second embodiment of the present invention.

DETAILED DESCRIPTION OF THE PREFERRED EMBODIMENTS

Figure 1:
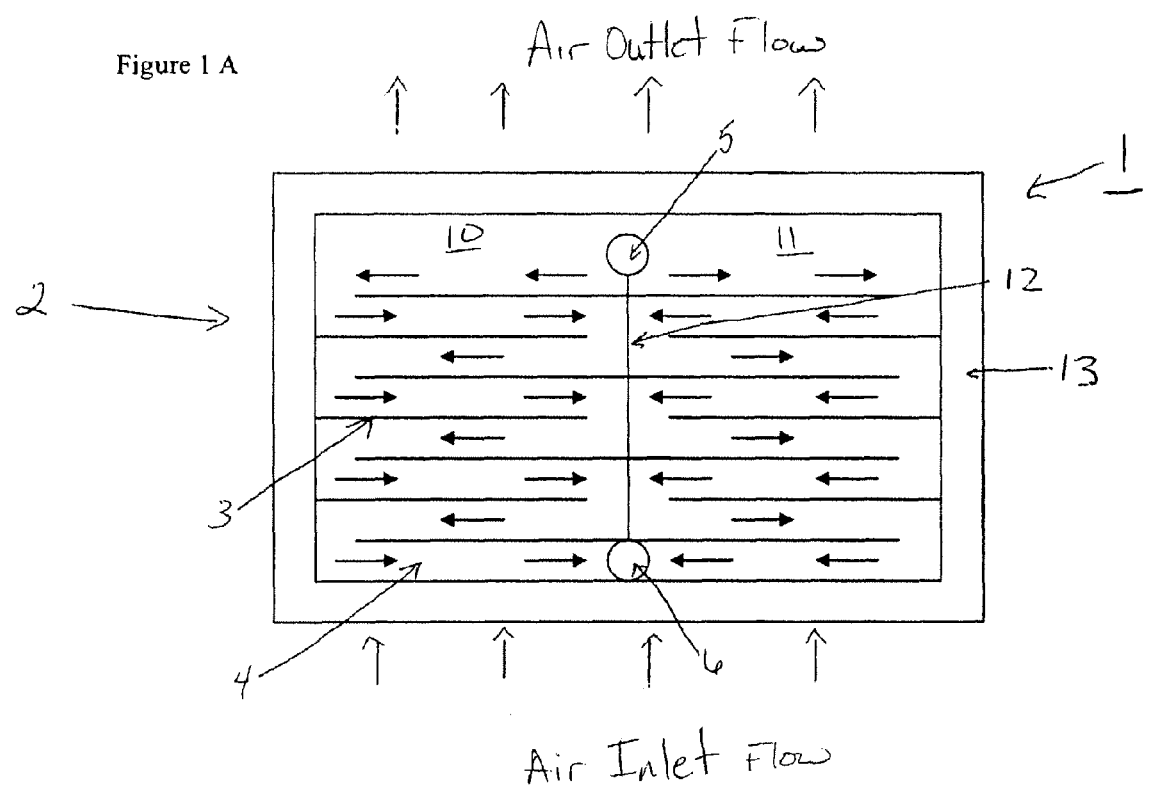
FIG. 1A is a top view of a first side of a fuel cell interconnect according to a first embodiment of the present invention.
FIG. 1B is a top view of a second side of the fuel cell interconnect of FIG. 1A according to the first embodiment of the present invention.

Embodiments will be described below with reference to the drawings.

Fuel cell systems are frequently built from a multiplicity of fuel cells in the form of stacks of planar elements, tubes, or other geometries. Fuel and air are provided to respective anode and cathode electrodes of a fuel cell. While solid oxide fuel cells (SOFCs) are preferred, other fuel cell types, such as molten carbonate, PEM, phosphoric acid and others, may be used instead of SOFCs.

A planar fuel cell system includes at least one gas-flow separator plate, typically also used as an interconnect. The interconnect contains channels and ribs and is made of or contains electrically conductive material, and may be formed from a metal alloy, such as a chromium-iron alloy, or from any appropriate electrically conductive ceramic material. Since an interconnect is exposed to both the oxidizing and the reducing ambients at high temperatures, it needs to be as stable as possible. Metal interconnects are typically fabricated from either sheet metal or via machining from stock material. Alternatively, a process of pressing and sintering metal powders can also be used to make interconnects.

The term "fuel cell system" as used herein, means a plurality of stacked fuel cells and interconnects which share a common fuel inlet and exhaust passages or risers, such as a fuel cell stack. The fuel cell system can be a distinct electrical entity which contains two end plates connected to power conditioning equipment and the power output of the system. The term fuel cell system can also be part of the distinct electrical entity. For example, plural stacks may share the same end plates, and the stacks jointly comprise a distinct electrical entity.

The fuel cells in the fuel cell system may be vertically or horizontally oriented. Alternatively, the fuel cells may be stacked it any appropriate direction between vertical and horizontal.

To achieve a reliable high fuel utilization in tall fuel cell systems, the pressure drop across the individual cell flow fields should be the predominate pressure drop within the system. When there is a tall fuel stack with internal fuel manifolds, the manifolds need to be large or the flow field channels need to be very shallow in order to reduce cell to cell fuel flow variability. A large fuel manifold reduces the active cell area that can be obtained from a given area, increasing costs, weight and volume of the system. A system with very shallow flow field channels would need to be highly accurate and would therefore be expensive. Additionally, variability of the anode electrode to interconnect interface would make it difficult for shallow channels to retain consistent and uniform flow rates.

Fuel cells using metallic interconnects with a simple parallel fuel and oxidant flow pattern typically lose performance coincident with thermal transients and/or load changes. This performance loss is probably the result of a loss of contact area between the interconnect and one or both of the electrodes. Any warping of the components of the fuel cell structure may lead to the loss of contact area.

FIG. 1A illustrates an interconnect 1 according to a first embodiment of the invention. Interconnect 1 comprises a first (fuel) side 2 which comprises a first plurality of ribs 3 and a first plurality of channels 4. The first plurality of channels 4 are configured to provide a serpentine fuel flow field. Interconnect 1 further comprises a fuel inlet opening 5 (e.g., a fuel manifold riser opening) and a fuel outlet opening 6.

Figure 1B:
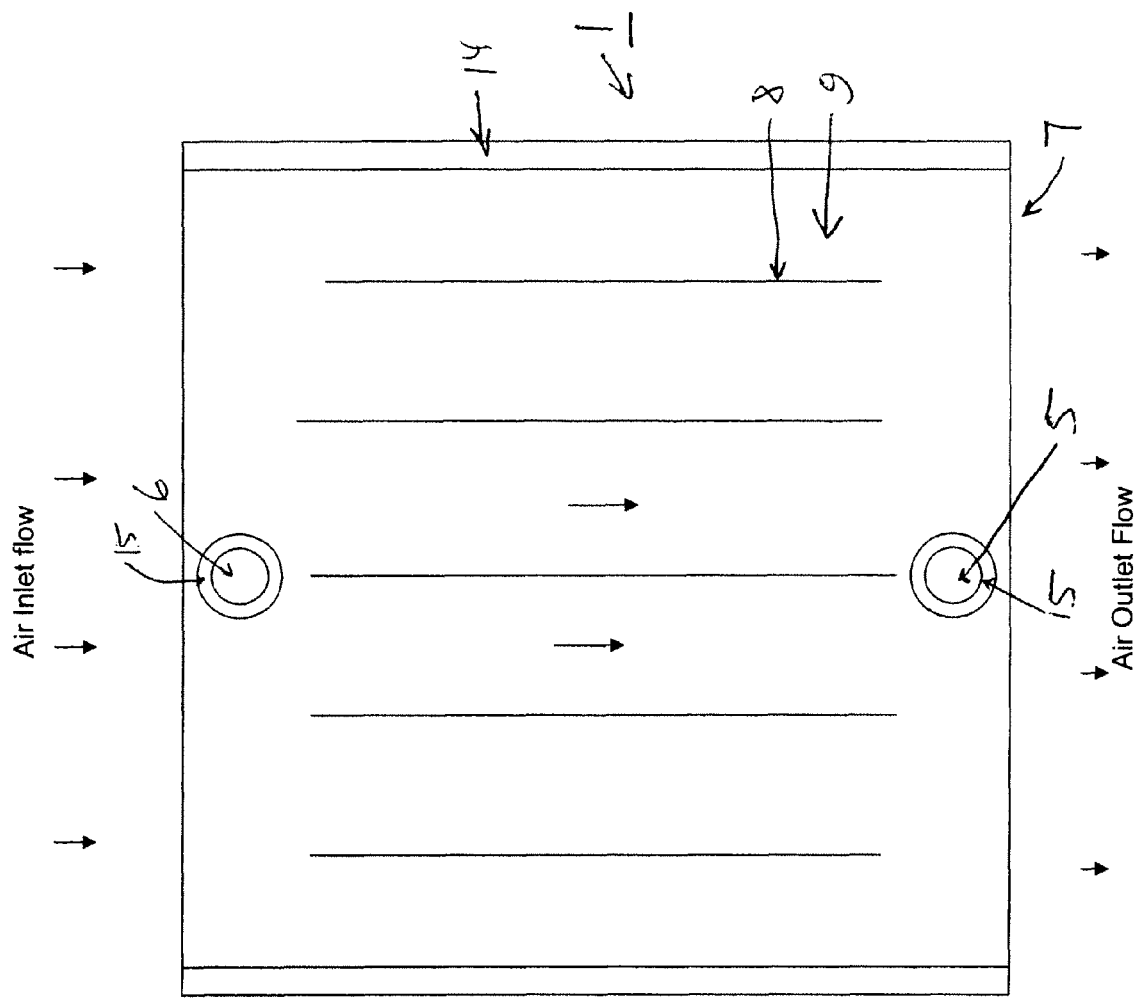

FIG. 1B illustrates a second (air) side 7 of interconnect 1. Second side 7 comprises a second plurality of ribs 8 and a second plurality of channels 9. The second plurality of channels 9 are configured to provide an approximately straight air flow field (which allows a 0-10% deviation from an exactly straight or linear flow field). FIGS. 1A and 1B illustrate an interconnect which is suitable for a fuel cell stack which is internally manifolded for fuel and externally manifolded for air, where the air is provided in external manifolds on opposite sides of the stack as illustrated by the arrows in FIGS. 1A and 1B. First side 2 and second side 7 are the major opposite sides of interconnect 1.

As illustrated in FIG. 1A, the serpentine fuel flow field of first side 2 of interconnect 1 is a parallel serpentine configuration. Preferably, the first plurality of channels 3 are configured to provide a parallel serpentine fuel flow field to a right half 11 of the first side 2 and to a left half 10 of the first side 2. The middle separator rib 12 separates the fuel flows to the right and left halves of the first side of the interconnect. A parallel serpentine configuration provides an increased length of each channel by reducing the number of anode flow channels required. This approach provides the advantage of increasing the flow field pressure drop without increasing the required channel accuracy. By not requiring an increase in channel accuracy, it is possible to use tall fuel stacks without increasing the size of the fuel manifolds necessary to achieve high fuel utilization.

Typically, a plurality of interconnects 1 are located between a plurality of fuel cells to form a fuel cell system or stack. The fuel cells can be any appropriate type of fuel cell. Preferably, the fuel cells comprise solid oxide fuel cells.

The spacing between the peaks of adjacent ribs 3 defines a pitch. Pitch is optimized for several considerations. One consideration is the pressure drop in each channel 4. Preferably, the ribs are spaced sufficiently close together to provide a relatively high pressure drop, which thereby limits and equalizes the flow within the channels 4. Another consideration is the lateral conductivity of the fuel cell electrodes. If ribs 3 are spaced too far apart, there may be insufficient electrical contact between the cell electrode and the interconnect 1, compromising performance of the fuel stack. Materials used on the cathode electrode generally have lower conductivity than the anode and therefore dictate the maximum rib spacing.

The fuel and air flows are still generally have co-flow or counter flow configuration. Although the overall system fuel pressure drop increases, it is retained well within the natural gas supply pressure. The air or other oxidant (such as oxygen) flow field of a simple parallel channel configuration in the co-flow or counter flow arrangement is maintained with the parallel serpentine fuel flow. Since the air or oxidant utilization is relatively low, it is possible to utilize the straight air flow field configuration. It is preferable to utilize this air or oxidant flow field to minimize the air blower parasitic power consumption. Additionally, the oxidant flow field of a simple parallel channel and rib configuration will significantly stiffen the interconnect 1, especially when combined with the ribs 8 on the second side 7 positioned perpendicular to ribs 3 on the first side 2 of interconnect 1. The stiffening of interconnect 1 makes it less prone to electrical contact destroying warpage.

In FIG. 1A, fuel inlet 5 and fuel outlet 6 are shown as fuel inlet and outlet openings in the interconnect 1. Interconnect 1 is configured for a fuel cell stack which is internally manifolded for fuel, in which the fuel travels through the stack through fuel riser channels which are formed by mated openings through the stacked interconnects and fuel cells. The fuel is distributed from layer to layer by a so called riser channel. This is a series of aligned openings in every layer (i.e., openings through each fuel cell and interconnect) which allows fuel to flow from the inlet end of the stack to each and every cell. Specifically, the fuel inlet riser channel is formed by aligned fuel inlet openings in the interconnects and in the fuel cells while the fuel outlet riser channel is formed by aligned fuel outlet openings in the interconnects and in the fuel cells.

However, if desired, interconnect 1 may be configured for a stack which is externally manifolded for fuel. In this case, the top and bottom edges of interconnect 1 shown in FIG. 1A would function as fuel inlet and fuel outlet, respectively, for the fuel which flows externally to the stack. Furthermore, the interconnect 1 shown in FIG. 1A is configured for a stack which is externally manifolded for air. However, additional openings through the interconnect may be formed on the left and right sides of the interconnect for the interconnect to be configured for a stack which is internally manifolded for air. As shown in FIG. 1A, a peripheral seal 13 extends around the first side of the interconnect to prevent air from flowing between the first side the interconnect and an adjacent fuel cell anode electrode. Strip seals 14 extend around two edges of the second side of the interconnect and donut seals 15 encircle the openings 5 and 6 to prevent the fuel from flowing between the second side of the interconnect and an adjacent fuel cell cathode electrode.

FIG. 2A illustrates an interconnect 21 according to a second embodiment of the invention. Interconnect 21 comprises a first (fuel) side 22 which comprises a first plurality of ribs 23 and a first plurality of channels 24. The first side 22 may be coated with a fuel reformation catalyst, such as nickel and/or rhodium. Interconnect 21 further comprises a fuel inlet opening 25 and a fuel outlet opening 26. The first plurality of channels 24 are configured to provide a continuous serpentine fuel flow field. Preferably, each of channels 24 are continuous and uninterrupted from fuel inlet opening 25 to fuel outlet opening 26.

Typically, the first plurality of serpentine channels 24 are configured to provide a fuel flow field comprising multiple passages, wherein the fuel flow field comprises a fuel flow path approximately directly from the fuel inlet opening 25 to the middle portion 27 of the first side 22, and continues from the middle portion to the periphery of the first side 22 and then to the outlet opening 26. The term "approximately directly" allows a deviation of 0-10% from a direct path between opening 25 and middle portion 27. The fuel flow path does not extend from the fuel inlet opening 25 directly to the periphery of the first side 22. In this configuration as illustrated in FIG. 2A, the initial fuel/water mixture passes across approximately 80% of the width of the fuel cell before reaching the periphery of the first side 22.

In this embodiment, since the interconnect is coated with a reformation catalyst, the interconnect can be used with internal reformation type fuel cells. By the fuel path flowing first to the middle portion 27 of the first side 22 of the interconnect, maximum cell cooling is achieved in the middle of the interconnect due to the endothermic fuel reformation reaction, where heat is typically more difficult to remove. By continuing to the periphery of the interconnect 21, the fuel flow path continues to an area of the interconnect 21 where cooling is more easily achieved from external radiation. As a fuel/water mixture proceeds through the fuel flow path and approaches the periphery of the adjacent fuel cell and interconnect, a majority of the endothermic reforming reaction has already occurred, and therefore the periphery of interconnect 21 is not unduly cooled. The fuel flow path continues from the periphery of the first side 22 towards the fuel outlet opening 26. By utilizing the serpentine flow path as illustrated in FIG. 2A, interconnect 21 maintains a more uniform temperature across the surface of the fuel cell and a much reduced tendency to degrade from anomalous voltage-current characteristics and/or increased temperature.

FIG. 2B illustrates a second (air) side 28 of interconnect 21. Second side 28 comprises a second plurality of ribs 29 and a second plurality of channels 30. The second plurality of channels 30 are configured to provide an approximately straight air flow field from air inlet openings 31 to air outlet openings 32. First side 22 and second side 28 are major opposite sides of interconnect 21.

In FIG. 2A, fuel inlet 25 and fuel outlet 26 are shown as fuel inlet and outlet openings in the interconnect 21. Interconnect 21 is configured for a fuel cell stack which is internally manifolded for fuel, in which the fuel travels through the stack through fuel riser channels which are formed by mated openings through the stacked interconnects and fuel cells. However, if desired, interconnect 21 may be configured for a stack which is externally manifolded for fuel. In this case, the top and bottom edges of interconnect 21 shown in FIG. 2A would function as fuel inlet and fuel outlet, respectively, for the fuel which flows externally to the stack. As illustrated in FIG. 2A, the serpentine fuel flow field of first side 22 of interconnect 21 is a parallel serpentine configuration. Furthermore, the interconnect 21 shown in FIG. 2B is configured for a stack which is internally manifolded for air. However, the interconnect may be configured for a stack with external air manifolding, in which case openings 31 and 32 would be omitted.

The perpendicular rib/channel configuration as illustrated in FIGS. 2A and 2B provide an increased stiffness of interconnect 21 (i.e., portions of ribs 23 are perpendicular to the ribs 29 on the opposite side of the interconnect). This increased stiffness of interconnect 21 is due to the multiple active areas that have the perpendicular rib/channel configuration.

Typically, a plurality of interconnects 21 are located between a plurality of fuel cells to form a fuel cell system or stack. The fuel cells can be any appropriate type of fuel cell. Preferably, the fuel cells comprise solid oxide fuel cells.

Figure 3A:
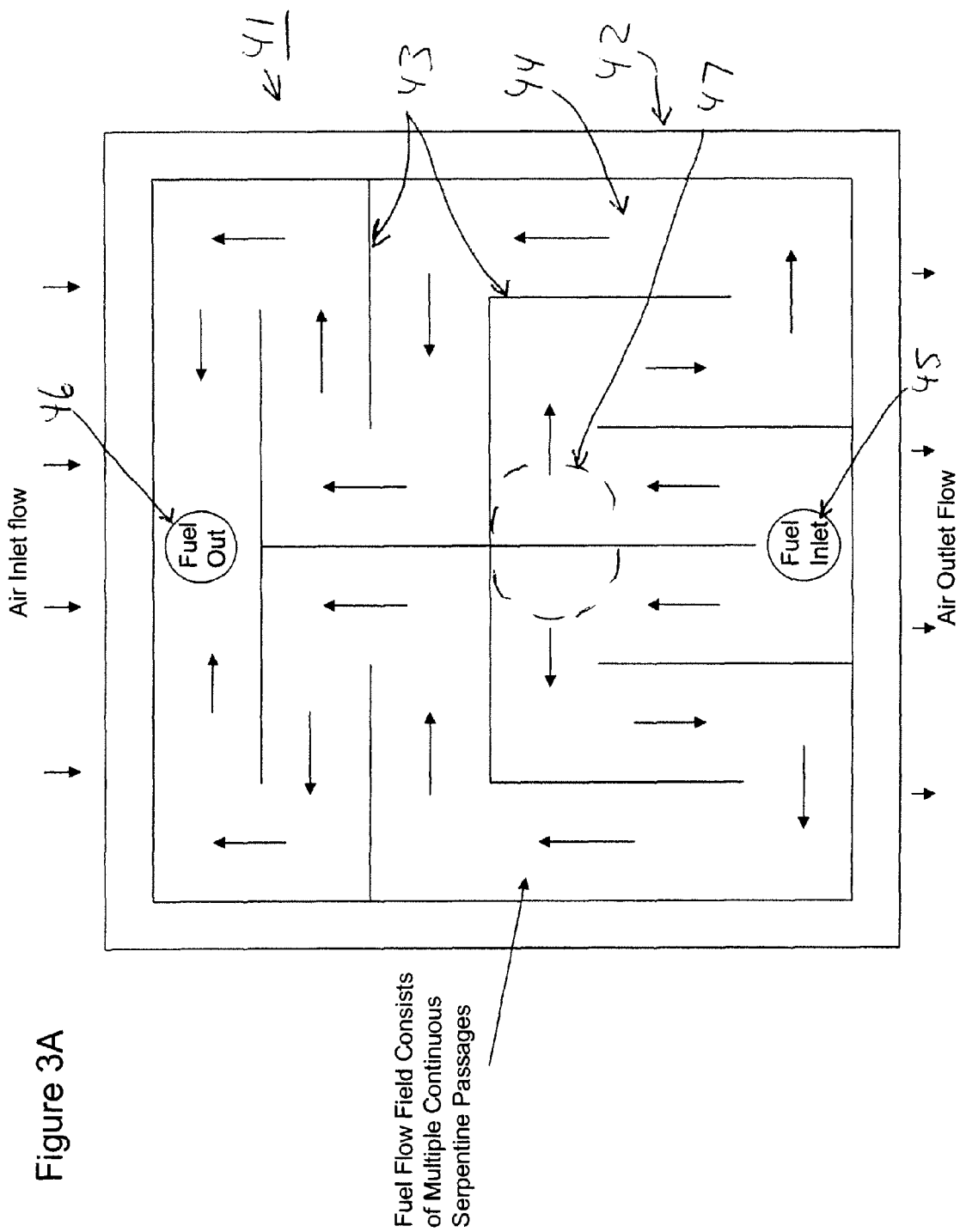
FIGS. 3A and 3B are top views of first sides of fuel cell interconnects according to a third embodiment of the present invention.

FIG. 3A illustrates an interconnect 41 according to a third embodiment of the invention. Interconnect 41 comprises a first (fuel) side 42 which comprises a first plurality of ribs 43 and a first plurality of channels 44. Interconnect 41 further comprises a fuel inlet opening 45 and a fuel outlet opening 46. The first plurality of channels 44 are configured to provide a continuous serpentine fuel flow field. Preferably, each of channels 44 are continuous and uninterrupted from fuel inlet opening 45 to fuel outlet opening 46.

Typically, the first plurality of channels 44 are configured to provide a fuel flow field comprising multiple passages, wherein the fuel flow field comprises a fuel flow path approximately directly from the fuel inlet opening 45 to the middle portion 47 of the first side 42, and continues directly from the middle portion to the periphery of the first side 42 and then to outlet opening 46.

In the configuration as illustrated in FIG. 3A, the initial fuel/water mixture passes across approximately 50% of the width of the interconnect before reaching the periphery of the first side 42. The fuel flow path continues from the periphery of the first side 42 back to the middle portion of the first side 42. The fuel flow path then continues back to the periphery of the first side 42 and then to fuel outlet opening 46. If desired, the initial fuel/water mixture may pass across more than 50%, such as 55-85%, for example 80% of the width of the interconnect before reaching the periphery of the first side 42, as shown in FIG. 3B.

If the interconnect is coated with a fuel reformation catalyst for internal reformation type stack, then the endothermic reformation reaction provides cooling to the fuel cell stack. By the fuel path flowing first to the middle portion of the first side 42, maximum cell cooling is achieved in the middle of the interconnect, where heat is generally more difficult to remove. By continuing to the periphery of the interconnect 41, the fuel flow path continues to an area of the interconnect 41 where cooling is more easily achieved from external radiation. By continuing from the periphery back to the middle portion of the interconnect 41, over-cooling in the inlet areas of the cell is avoided. By utilizing the serpentine flow path as illustrated in FIGS. 3A and 3B, interconnect 41 maintains a more uniform temperature across the surface of the fuel cell and a much reduced tendency to degrade from anomalous voltage-current characteristics and/or increased temperature.

Figure 3B:
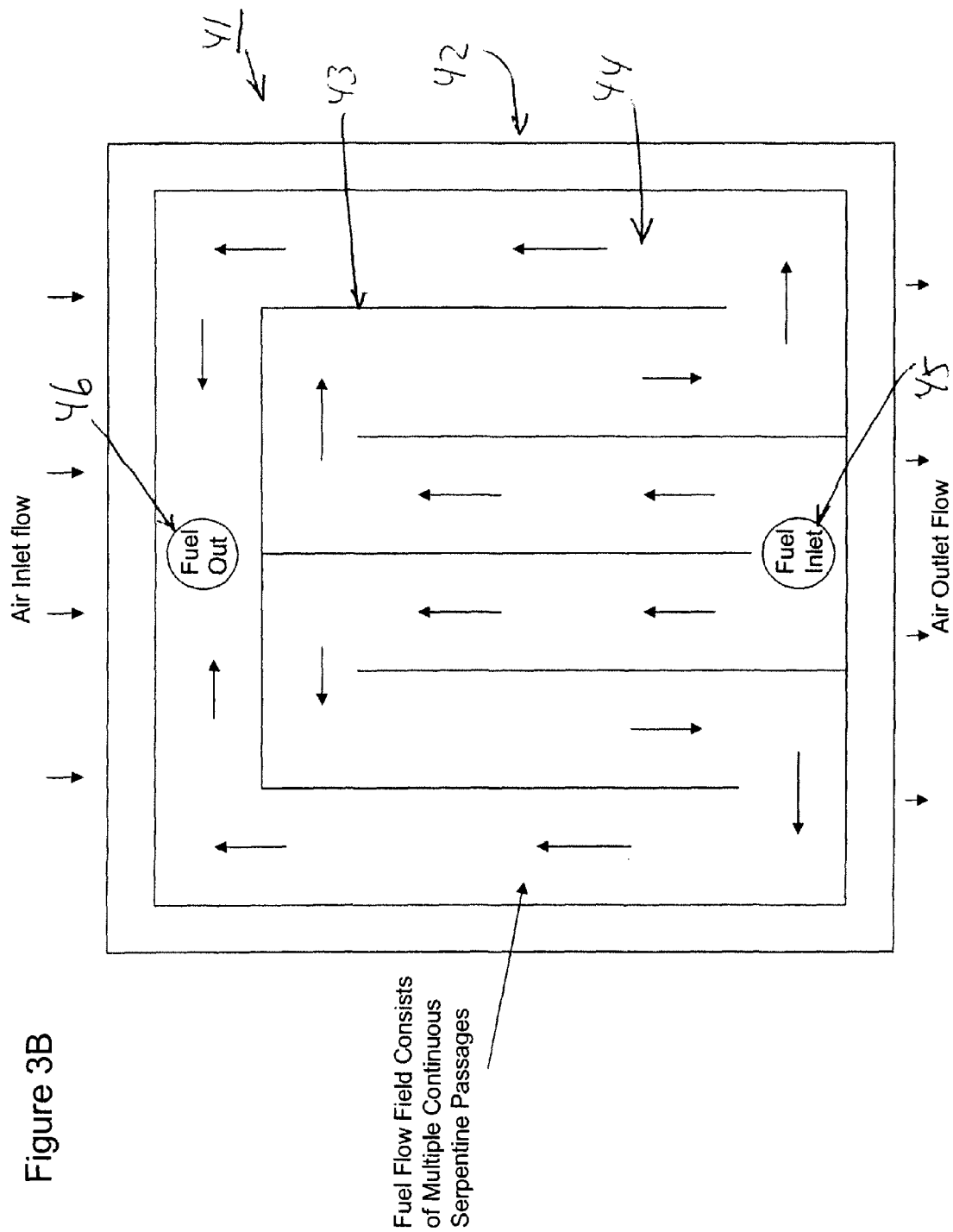

The configuration as illustrated in FIG. 3A would result in approximately 70% more area having a perpendicular rib/channel configuration than the interconnect illustrated in FIG. 3B. This results in interconnect having a greater stiffness. Additionally, the increased number of turns in the fuel flow path would result in a higher fuel pressure drop.

The second (air) side of interconnect 41 can be the same as that illustrated in FIG. 1B, having straight ribs and channels. Typically, a plurality of interconnects 41 are located between a plurality of fuel cells to form a fuel cell system or stack. The fuel cells can be any appropriate type of fuel cell. Preferably, the fuel cells comprise solid oxide fuel cells. Interconnect 41 is configured for a stack which is internally manifolded for fuel and externally manifolded for air.

Figure 4:
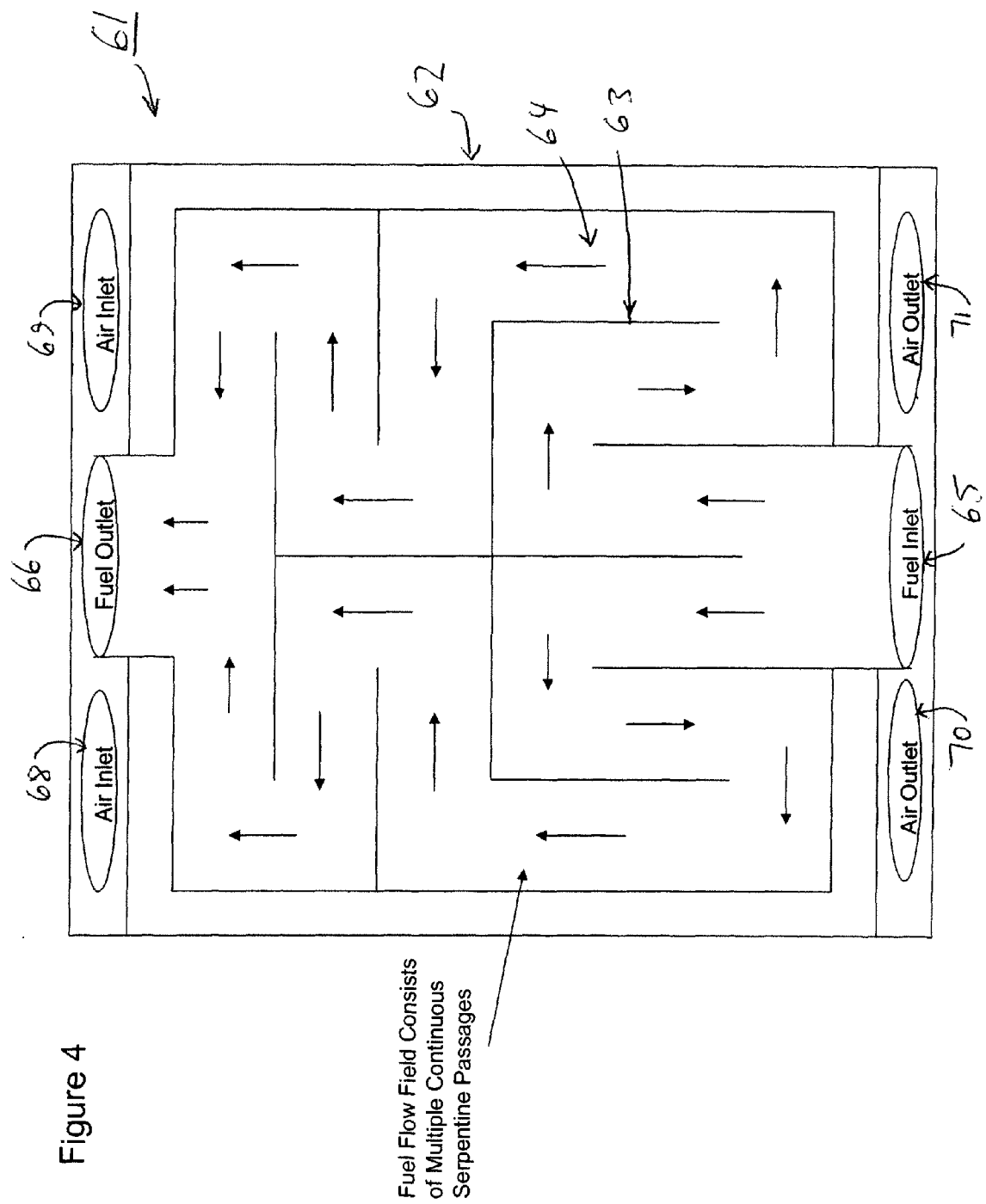
FIG. 4 is a top view of a first side of another fuel cell interconnect according to a fourth embodiment of the present invention.

FIG. 4 illustrates an interconnect 61 according to a fourth embodiment of the invention. The interconnect 61 is the same as interconnect 41 shown in FIGS. 3A and 3B, except that interconnect 61 is configured for a stack that is internally manifolded for both air and fuel.

Interconnect 61 comprises a first (fuel) side 62 which comprises a first plurality of ribs 63 and a first plurality of channels 64. Interconnect 61 further comprises a fuel inlet opening 65 and a fuel outlet opening 66. The first plurality of channels 64 are configured to provide a continuous serpentine fuel flow field. Preferably, each of channels 64 are continuous and uninterrupted from fuel inlet opening 65 to fuel outlet opening 66.

Interconnect 61 further comprises a first air inlet opening 68, a second air inlet opening 69, a first air outlet opening 70 and a second air outlet opening 71. The air flow is internally manifolded. The fuel inlet opening 65, fuel outlet opening 66, first air inlet opening 68, second air inlet opening 69, first air outlet opening 70, and second air outlet opening 71 may be configured to be outboard of the electrolyte of the fuel cell which contacts the interconnect 61. The second side of interconnect 61 may be similar to that illustrated in FIG. 2B and may contain straight ribs and channels.

Figure 5:
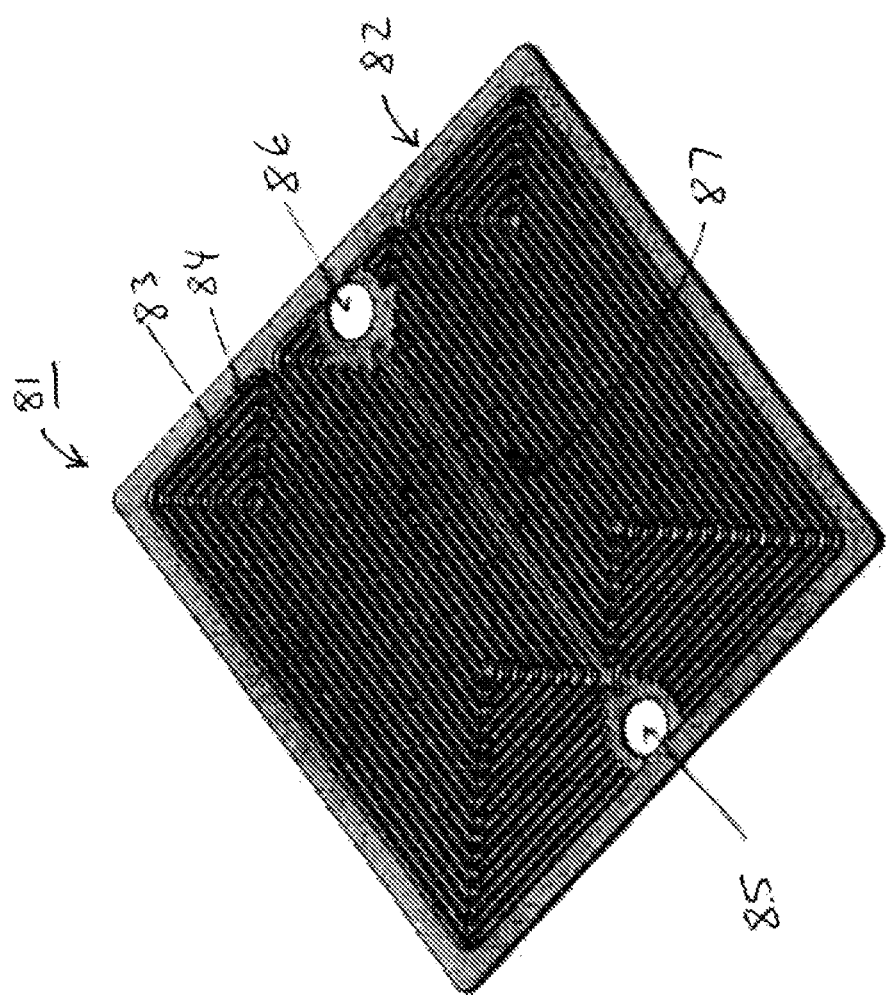
FIG. 5 is a top view of a first side of a fuel cell interconnect according to a fifth embodiment of the present invention.

FIG. 5 illustrates an interconnect 81 according to a fifth embodiment of the invention. Interconnect 81 comprises a first (fuel) side 82 which comprises a first plurality of ribs 83 and a first plurality of channels 84. Interconnect 81 further comprises a fuel inlet opening 85 and a fuel outlet opening 86. The first plurality of channels 84 are configured to provide a continuous serpentine fuel flow field. Preferably, each of channels 84 is continuous and uninterrupted from fuel inlet opening 85 to fuel outlet opening 86.

The interconnect 81 is similar to interconnect 41 shown in FIG. 3B, except that the channels on the fuel side in interconnect 81 follow the periphery of the majority of or the entire interconnect before being provided to the middle rather than from middle to periphery of interconnect as in interconnect 41.

The first plurality of channels 84 of interconnect 81 are configured to provide a fuel flow field comprising multiple passages, wherein the fuel flow field comprises a fuel flow path approximately directly (which allows a 0-10% deviation from a direct path) from the fuel inlet opening 85 to the periphery of the first side 82 without passing to the middle portion 87 of the first side 82. The fuel flow path of interconnect 81 continues from the periphery of the first side 82 in a serpentine configuration around the edge of the interconnect to the middle portion the first side 82. Typically, the fuel flow path flows first from the fuel inlet opening 85 to the periphery portion of the first side 82. The fuel flow path then continues around the periphery and then to the middle portion 87 of the first side 82 and then from the middle to the fuel outlet opening 86.

Preferably, the fuel side of the interconnect is not coated with a reformation catalyst and the fuel cell stack operates with hydrogen fuel or an external reformer. In this case, without internal reformation, the periphery of the first side 82 of interconnect 81 are subjected to the highest current during operation of a fuel cell stack. Thus, the majority of the heat generation occurs close to the periphery or edge of the interconnect providing a short path to the environment for heat ejection. By creating a shorter heat path toward the edges of the interconnect where cooling is more easily obtained from external radiation, the reduction in overall temperature difference across the interconnect may be achieved.

The second side of the interconnect 81 may be similar to that shown in FIG. 1B, with straight ribs and channels. Typically, a plurality of interconnects 81 are located between a plurality of fuel cells to form a fuel cell system or stack. The fuel cells can be any appropriate type of fuel cell. Preferably, the fuel cells comprise solid oxide fuel cells.

Figure 6:
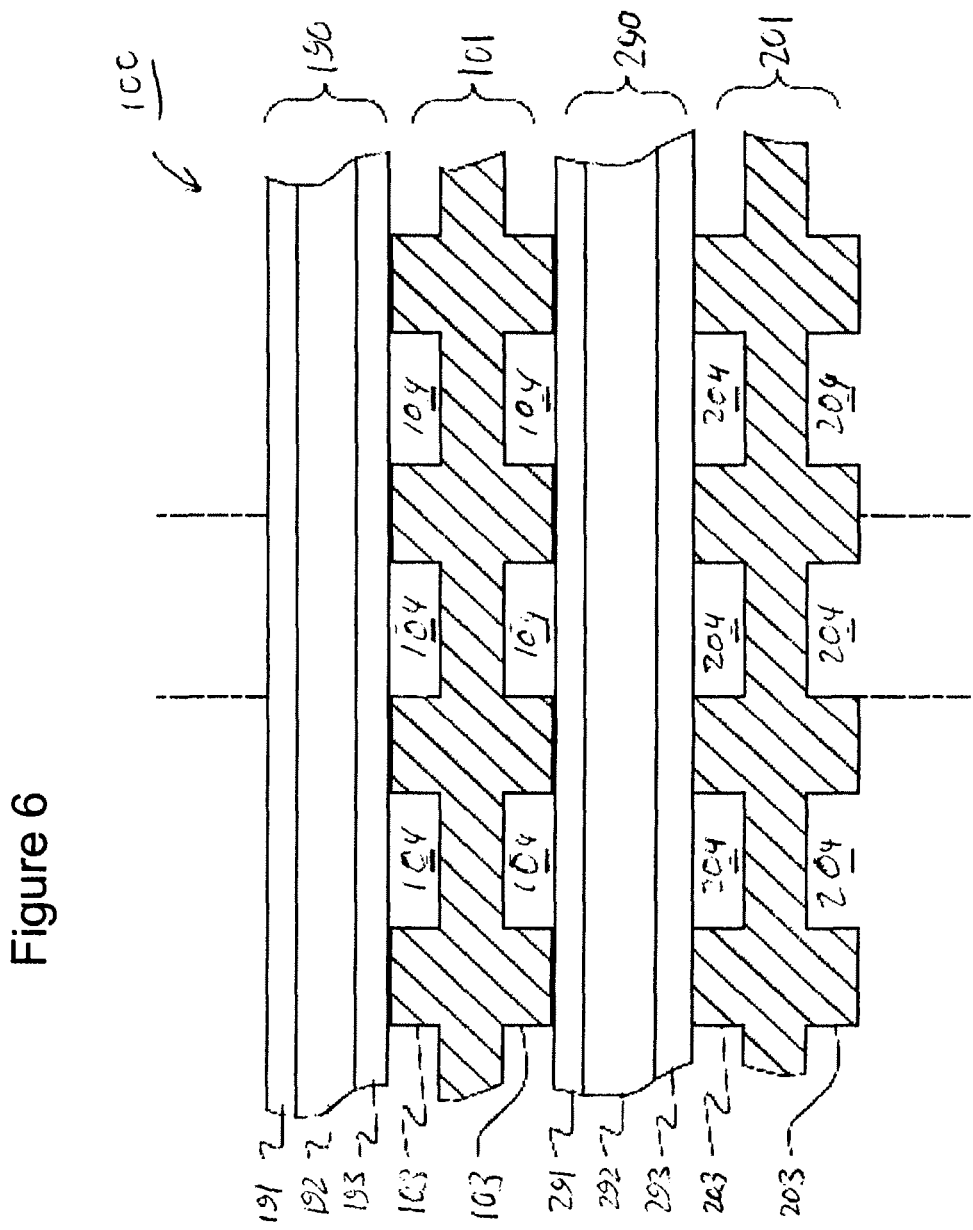
FIG. 6 is a side cross-sectional view of a fuel cell stack according to an embodiment of the present invention.

FIG. 6 illustrates a fuel cell stack 100 with alternating fuel cells 190 and 290 and interconnects 101 and 201. Each major side of each fuel cell is contacted by ribs 103, 203 of two adjacent interconnects 101, 201. For example, the anode (fuel) electrode 291 of the second cell 290 is contacted by the ribs 103 of the first side of the first interconnect 101. The cathode (air) electrode 293 of the second cell 290 is contacted by the ribs 203 of the second side of the second interconnect 201. The second fuel cell 290 also contains an electrolyte 292 located between the anode and cathode electrodes. Likewise, the first fuel cell 190 contains an electrolyte 192 located between the anode 191 and cathode 193 electrodes.

Channels 104, 204 in each interconnect are provided on opposite sides of each fuel cell to provide fuel and oxidant flow paths to respective anode and cathode electrodes. For example, channels 104 in first side of interconnect 101 provide an anode flow, such as a fuel flow or fuel/water flow, to the anode 291 of cell 290. Channels 204 in second side of interconnect 201 provide an oxidant flow, such as an air flow, to the cathode 293 of cell 290. Fuel cell stack 100 may provide internal and/or external manifolding for air and fuel as discussed above.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A fuel cell interconnect, comprising:
    a first side comprising a first plurality of ribs and a first plurality of channels;
    a second side comprising a second plurality ribs and a second plurality of channels;
    a fuel inlet opening located adjacent to a first edge of the first side; and
    a fuel outlet opening located adjacent to a second edge of the first side opposite the first edge, wherein a width of the first side is defined between the first edge and the second edge;
    wherein:
        the first and second sides are disposed on opposite sides of the interconnect,
        the first plurality of channels are configured to provide a serpentine fuel flow field comprising multiple serpentine passages, wherein the serpentine fuel flow field comprises a fuel flow path which extends approximately directly from the fuel inlet opening to a middle portion of the first side, and which continues from the middle portion to first and second peripheral portions on a respective left half and a right half of the first side, wherein the middle portion is located between the first and second peripheral portions and the flow path passes across at least approximately 50% of the width of the first side before reaching the first and second peripheral portions, and
        the second plurality of channels are configured to provide an air flow field.

2. The fuel cell interconnect of claim 1 wherein the second plurality of channels are configured to provide an approximately straight air flow field.

3. The fuel cell interconnect of claim 1, wherein the multiple serpentine passages are essentially continuous and uninterrupted from the fuel inlet opening to the fuel outlet opening.

4. The fuel cell interconnect of claim 1, wherein the fuel flow path first extends at least 50% of the width of the first side from the fuel inlet opening and across the middle portion of the first side.

5. The fuel cell interconnect of claim 4, wherein the fuel flow path continues from the first and second peripheral portions of the first side to the fuel outlet opening.

6. The fuel cell interconnect of claim 1, wherein the fuel flow path continues from the first and second peripheral portions of the first side back towards the middle of the first side.

7. The fuel cell interconnect of claim 6, wherein the fuel flow path continues from the middle of the first side towards the fuel outlet opening.

8. The fuel cell interconnect of claim 1, wherein the first side is coated with a fuel reformation catalyst.

9. The fuel cell interconnect of claim 1, wherein the fuel flow path does not directly extend from the fuel inlet opening to the first and second peripheral portions of the first side.

10. A fuel cell stack, comprising:
    a plurality of fuel cells, and
    a plurality of interconnects of claim 1 located between the plurality of fuel cells.

11. The stack of claim 10, wherein the plurality of fuel cells comprise solid oxide fuel cells.

12. The stack of claim 11, wherein the solid oxide fuel cells comprise internal reformation type fuel cells and further comprising a fuel reforming catalyst located adjacent to least the middle portion of the first side of the interconnect in the fuel cell stack.

13. The fuel cell interconnect of claim 1, wherein both the fuel inlet opening and the fuel outlet opening are located approximately halfway between the first and second peripheral portions on the respective left half and right half of the first side.

14. The fuel cell interconnect of claim 13, wherein the fuel flow path between the fuel inlet opening and the fuel outlet opening extends from approximately halfway between the first and second peripheral portions to the first and second peripheral portions, and from the first and second peripheral portions to approximately halfway between the first and second peripheral portions.

* * * * *